US010097739B2

United States Patent
Uetani

(10) Patent No.: US 10,097,739 B2
(45) Date of Patent: Oct. 9, 2018

(54) PROCESSING DEVICE FOR PERFORMING GAMMA CORRECTION

(71) Applicant: Kabushiki Kaisha Toshiba, Minato-ku, Tokyo (JP)

(72) Inventor: Yoshiharu Uetani, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/609,940

(22) Filed: May 31, 2017

(65) Prior Publication Data

US 2018/0084157 A1    Mar. 22, 2018

Related U.S. Application Data

(60) Provisional application No. 62/395,468, filed on Sep. 16, 2016.

(51) Int. Cl.
*H04N 5/202* (2006.01)

(52) U.S. Cl.
CPC .................... *H04N 5/202* (2013.01)

(58) Field of Classification Search
CPC ...................................................... H04N 5/202
USPC ........................................................ 348/674
See application file for complete search history.

(56) References Cited

U.S. PATENT DOCUMENTS

| | | | |
|---|---|---|---|
| 5,710,594 A | 1/1998 | Kim | |
| 6,344,857 B1* | 2/2002 | Matono | G09G 3/20 345/589 |
| 6,570,611 B1* | 5/2003 | Satou | G09G 3/20 348/189 |
| 6,987,499 B2* | 1/2006 | Yamaguchi | G09G 3/3648 345/690 |
| 7,271,939 B2* | 9/2007 | Kono | G06T 5/009 358/1.9 |
| 7,612,831 B2* | 11/2009 | Miyasaka | H04N 5/202 348/674 |

(Continued)

FOREIGN PATENT DOCUMENTS

| JP | H7-162717 A | 6/1995 |
|---|---|---|
| JP | H8-195895 A | 7/1996 |

(Continued)

*Primary Examiner* — Paulos M Natnael
(74) *Attorney, Agent, or Firm* — White & Case LLP

(57) ABSTRACT

A processing device includes generation circuitry, storage circuitry, and interpolation circuitry. The generation circuitry generates a first index based on a numerical value of a high-order predetermined number of digits. The converted value of the reference input value corresponding to each index obtained in the generation circuitry is beforehand stored as a look-up table in the storage circuitry. The interpolation circuitry acquires the first converted value corresponding to the first index using the look-up table. And the interpolation circuitry computes the second index that adjoins the first index by carrying out increment or decrement of the first index. Furthermore, the interpolation circuitry acquires the second converted value corresponding to the second index using the look-up table of the storage circuitry. And the interpolation circuitry computes the converted value of the input value by linearity interpolation based on the shift amount from the reference input value of the first index.

11 Claims, 13 Drawing Sheets

(56) References Cited

U.S. PATENT DOCUMENTS

| | | | |
|---|---|---|---|
| 8,094,238 B2 * | 1/2012 | Tagami | H04N 9/69 348/674 |
| 2005/0002563 A1 * | 1/2005 | Hoshuyama | H04N 1/407 382/162 |

FOREIGN PATENT DOCUMENTS

| | | |
|---|---|---|
| JP | 2732820 B2 | 3/1998 |
| JP | 2002-16805 A | 1/2002 |
| JP | 3552996 B2 | 8/2004 |
| JP | 4062031 B2 | 3/2008 |
| WO | 02/01850 A1 | 1/2002 |

* cited by examiner

|     | 16 | 15 | 14 | 13 | 12 | 11 | 10 | 9 | 8 | 7 | 6 | 5 | 4 | 3 | 2 | 1 |
|-----|----|----|----|----|----|----|----|---|---|---|---|---|---|---|---|---|
|     | 15 | 14 | 13 | 12 | 11 | 10 | 9  | 8 | 7 | 6 | 5 | 4 | 3 | 2 | 1 | 0 |
| 129 | 0  | 0  | 0  | 0  | 0  | 0  | 0  | 0 | 1 | 0 | 0 | 0 | 0 | 0 | 0 | 1 |
| 192 | 0  | 0  | 0  | 0  | 0  | 0  | 0  | 0 | 1 | 1 | 0 | 0 | 0 | 0 | 0 | 0 |
| 195 | 0  | 0  | 0  | 0  | 0  | 0  | 0  | 0 | 1 | 1 | 0 | 0 | 0 | 0 | 1 | 1 |

PROCESSING DEVICE FOR PERFORMING GAMMA CORRECTION

CROSS REFERENCE TO RELATED APPLICATIONS

This application is based upon and claims the benefit of priority from the prior US Provisional Patent Application No. 62/395,468, filed on Sep. 16, 2016, the entire contents of which are incorporated herein by reference.

FIELD

Embodiments described herein relate generally to a processing device.

BACKGROUND

An input value from a camera is nonlinearly converted into a converted value and an image based on the converted value is displayed by a monitor. It is requested to increase the speed of arithmetic processing of circuitry that performs the nonlinear conversion and reduce a memory capacity. Therefore, reference converted values of reference input values at predetermined intervals are stored in a memory as a look-up table. The converted value of an input value between reference input values is computed by linear interpolation using those reference converted values read from the look-up table.

However, when the linear interpolation is performed, the detection of the two reference input values corresponding to an input value is needed. It is likely that a longer calculation time is consumed for the detection processing.

BRIEF DESCRIPTION OF THE DRAWINGS

FIG. 3 is a diagram for explaining data[15:6] and data[5:0];

DETAILED DESCRIPTION

According to an embodiment, a processing device includes generation circuitry, storage circuitry, and interpolation circuitry. The generation circuitry generates a first index based on a numerical value of a high-order predetermined number of digits in the case in which an input value is represented by a bit string and a shift amount based on a numerical value of a low-order number of digits excluding the high-order predetermined number of digits. The converted value of the reference input value corresponding to each index obtained in the generation circuitry is beforehand stored as a look-up table in the storage circuitry.

The interpolation circuitry acquires the first converted value corresponding to the first index using the look-up table of the storage circuitry. And the interpolation circuitry computes the second index that adjoins the first index by carrying out increment or decrement of the first index. Furthermore, the interpolation circuitry acquires the second converted value corresponding to the second index using the look-up table of the storage circuitry. And the interpolation circuitry computes the converted value of the input value by linearity interpolation based on the shift amount from the reference input value of the first index.

Hereinafter, embodiments of the present invention will be described with reference to the drawings. The embodiments do not limit the present invention.

(First Embodiment)

In a processing device according to a first embodiment, a generation circuitry generates an index based on a numerical value of a predetermined digit number of high-order of an input value, and a shift amount based on a numerical value of a low-order number of digits excluding the predetermined digit number of the high-order of the input value. This processing reduces the detection processing of two reference input values corresponding to the input value, and the calculation processing of the shift amount which is the difference between the input value and the reference input value. The processing device is explained more in detail below.

Figure 1:
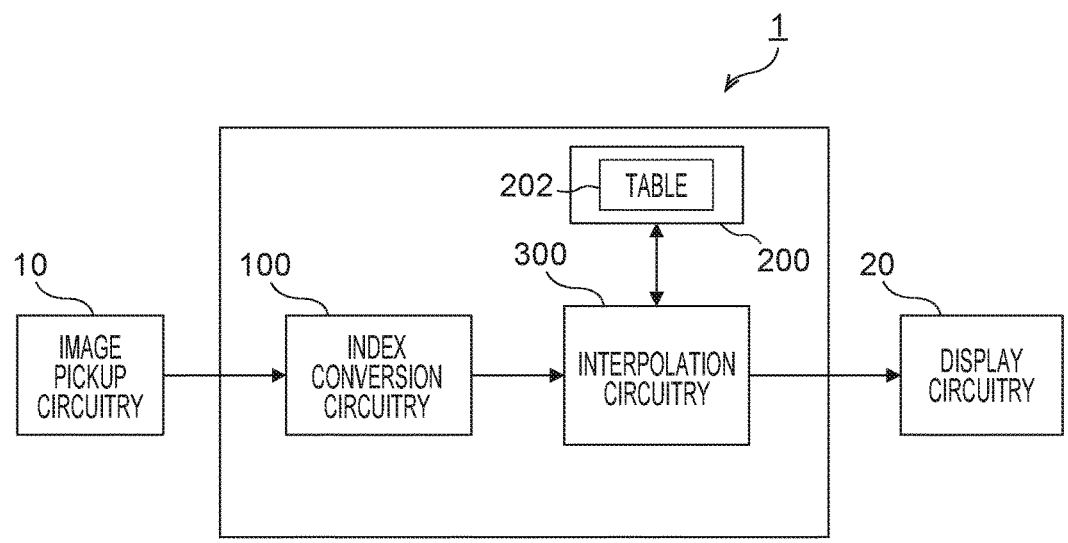
FIG. 1 is a block diagram showing a configuration example of a processing device according to a first embodiment.

First, components of a processing device 1 according to the first embodiment are explained with reference to FIG. 1. FIG. 1 is a block diagram showing a configuration example of the processing device 1 according to the first embodiment. As shown in FIG. 1, the processing device 1 is a device capable of converting a pixel value of image data into an output value of a nonlinear function through linear interpolation. The processing device 1 includes index conversion circuitry 100, storage circuitry 200, and interpolation circuitry 300.

The processing device 1 according to the first embodiment performs gamma correction processing conforming to Expression (1) on, for example, a pixel value of image data. That is, the processing device 1 performs gamma correction processing for converting an input value x into a converted value f(x) through linear interpolation.

[Expression 1]

$$f(x) = x^{1/\gamma} \quad (1)$$

Figure 2:
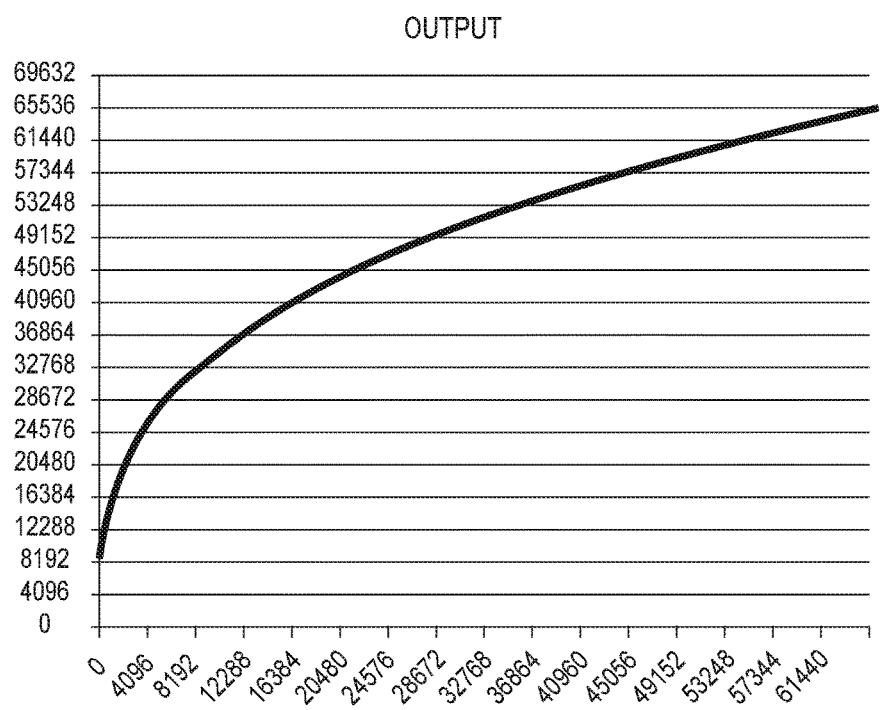
FIG. 2 is a diagram showing an example of an input/output characteristic of gamma correction processing conforming to Expression (1)

FIG. 2 is a diagram showing an example of an input/output characteristic of the gamma correction processing conforming to Expression (1). The horizontal axis indicates the input value x and the vertical axis indicates the converted value f(x). As it is seen from FIG. 2, a gamma characteristic has a nonlinear input/output characteristic in which a change in the converted value f(x) is gentler as the input value x is larger.

The input value x is a pixel value of image data. The image data is input from image pickup circuitry 10. The image pickup circuitry 10 is, for example, a camera. The pixel value of the image data is, for example, 16 bits and has values of 0 to 65535. Note that the pixel value of the image data is not limited to 16 bits. The pixel value of the image data may be, for example, 64 bits, 32 bits, or 8 bits.

The index conversion circuitry 100 is connected to the image pickup circuitry 10 and the interpolation circuitry 300. The index conversion circuitry 100 outputs an index corresponding to the input value x input from the image pickup circuitry 10 to the interpolation circuitry 300. Specifically, the index conversion circuitry 100 is a processor that generates an index based on a numerical value of a high-order predetermined number of digits in the case in which the input value x is represented by a bit string. The index is used to acquire the converted value f(x) associated with the index from a look-up table 202 stored in the storage circuitry 200.

The index is incremented at every predetermined interval D of an input value. Types of indexes are fewer than types of input values. A minimum value among input values at every predetermined interval D is associated with the indexes as an entry point. In this embodiment, the entry point corresponds to a reference input value.

For example, when the interval D is set to 64, an index 0 corresponds to an input value 0 to 63, an index 1 corresponds to an input value 64 to 127, and an index 2 corresponds to an input value 128 to 191. In this case, if the index is 0, the entry point is 0. If the index is 1, the entry point is 64. If the index is 2, the entry point is 128.

The index conversion circuitry 100 outputs a correction multiplier corresponding to the input value x to the interpolation circuitry 300. Specifically, the index conversion circuitry 100 outputs, as the correction multiplier, a shift amount based on a numerical value of a low-order number of digits excluding a high-order predetermined number of digits used for the generation of the index. The correction multiplier means a shift amount between the entry point corresponding to the index converted by the index conversion circuitry 100 on the basis of the input value and the input value.

For example, as explained above, if the input value is 64 to 127, the index is 1 and the entry point corresponding to the index 1 is 64. In this case, a shift amount between the entry point 64 and the input value 64 to 127 is 0 to 63.

In this way, it is possible to obtain, on the basis of the input value, the index and the shift amount from the entry point corresponding to the index. The index conversion circuitry 100 is explained in detail below. Note that, in this embodiment, the index conversion circuitry 100 corresponds to the generation circuitry.

The storage circuitry 200 is, for example, an SRAM (Static Random Access Memory) and is circuitry that stores the look-up table 202. In the look-up table 202, the index and the converted value f(x) of the entry point corresponding to the index are recorded in association with each other in advance. More specifically, the storage circuitry 200 is connected to the interpolation circuitry 300. The storage circuitry 200 outputs a converted value corresponding to the index to the interpolation circuitry 300.

The interpolation circuitry 300 is connected to the index conversion circuitry 100, the storage circuitry 200, and the display circuitry 20. That is, the interpolation circuitry 300 is a processor that acquires, using the look-up table 202 of the storage circuitry 200, a first converted value corresponding to a first index generated by the index conversion circuitry 100 and a second converted value corresponding to a second index adjacent to the first index and performs, on the basis of a shift amount, linear interpolation of a converted value for an input value between an entry point of the first index and an entry point of the second index. More specifically, the interpolation circuitry 300 performs linear interpolation conforming to Expression (2) using the first index and the shift amount input from the index conversion circuitry 100 and outputs a calculation result f(x) to the display circuitry 20. The display circuitry 20 is, for example, a monitor. The display circuitry 20 converts a linear interpolation value input from the interpolation circuitry 300 into a luminance signal and displays the luminance signal. Note that gamma γ of Expression (1) may be set on the basis of a gamma characteristic of the monitor.

[Expression 2]

$$f(x) = \text{tab}(I1) + \frac{Z}{D} \times \{\text{tab}(I1+1) - \text{tab}(I1)\} \quad (2)$$

In Expression 2, I1 indicates the first index input from the index conversion circuitry 100, Z indicates the shift amount, (I1+1) indicates the second index obtained by incrementing the first index, and tab (I1) indicates a converted value output by the look-up table 202 with respect to the index I1. Further, D is an interval between entry points and is a predetermined interval as explained above.

As it is seen from the above, the index I1 is generated on the basis of the numerical value of the high-order predetermined number of digits in the input value x. Therefore, it is possible to calculate a shift amount Z from the entry point corresponding to the index I1 on the basis of the numerical value of the low-order number of digits. Consequently, after the look-up table 202 is recorded, it is possible to calculate the shift amount Z, tab (I1), and tab (I1+1), which are necessary in the calculation of Expression (2), using only the input value x. Therefore, since the determination processing for determining to which entry point interval the input value x corresponds is unnecessary, it is possible to further increase calculation speed. Further, it is unnecessary to calculate the shift amount Z. In a general method, a value of the entry point is subtracted from an input value X to calculate a shift amount. However, the subtraction processing is also unnecessary. Therefore, it is possible to further increase the calculation speed.

Note that, as indicated by Expression (3), the linear interpolation may be performed using tab (I1−1) instead of tab (I1+1). (1−1) indicates the second index obtained by decrementing the first index. In general, the linear interpolation indicated by Expression (2) is called linear interpolation of interpolation. The linear interpolation indicated by Expression (3) is called linear interpolation of extrapolation.

[Expression 3]

$$f(x) = \text{tab}(I1) + \frac{Z}{D} \times \{\text{tab}(I1) - \text{tab}(I1-1)\} \quad (3)$$

Next, details of processing in the index conversion circuitry 100 are explained with reference to FIG. 3. FIG. 3 is a diagram for explaining data[15:6] and data[5:0]. In FIG. 3, the top row indicates the number of digits and the next row indicates a value of (the number of digits−1). Lower rows are respectively bit strings representing 129, 192, and 195 (decimal numbers) as binary numbers. 30A indicates a numerical value range of high-order 16 digits to high-order 7 digits. 30B indicates a numerical value range of six digits to one digit excluding high-order 16 digits to high-order 7 digits.

As explained above, the index is a value based on the numerical value of the high-order predetermined number of digits. Specifically, when an input value is represented by a bit string, the index conversion circuitry 100 calculates, as the index, a value based on a numerical value of high-order h1 digits to high-order h2 digits. For example, the index is a value based on a numerical value of high-order 16 digits to high-order 7 digits in the case in which the input value is represented by a bit string of 16 bits as indicated by 30A.

In this case, for example, if the input value is 129, the input value 129 can be represented by a bit string of 16 digits [0,0,0,0,0,0,0,0,1,0,0,0,0,0,0,1] (a binary number). 2 (a decimal number), which is a numerical value based on a numerical value [0,0,0,0,0,0,0,0,1,0] (a binary number) of high-order 16 digits to high-order 7 digits, is the index. Note that, since the input value 129 can be represented by a binary number of 8 digits, 0 is arranged as a bit string in 16 digits to 9 digits. In this way, the index conversion circuitry 100 is capable of converting the input value, which is a decimal number, into a bit string of a binary number, an octal number, a hexadecimal number, or the like.

In this embodiment, a value obtained by extracting a numerical value of h1 digits to h2 digits of the input value and representing the value as a decimal number is written as data[(h1−1):(h2−1)]. When the input value is represented as a base-n number, the input value is represented as data$_{(n)}$ [(h1−1):(h2−1)]. In the representation of data$_{(n)}$ [(h1−1):(h2−1)], "data" is a name. Any character is allocated to "data."

For example, when the input value is represented by a binary number, the input value is written as data$_{(2)}$ [(h1−1):(h2−1)]. When the input value is represented by an octal number, the input value is written as data$_{(8)}$ [(h1−1):(h2−1)]. Note that, in the following explanation, an input value is represented by a binary number except when explanation is necessary. Therefore, in this embodiment, to simplify description, when the input value is represented by the binary number, the description of "$_{(2)}$" is omitted and the input value is simply written as data[(h1−1):(h2−1)].

For example, when the input value is written as data[15:6], the input value means a value obtained by converting a numerical value of 16 digits to 7 digits in the input value, which is converted into a binary number, into a decimal number. That is, when the input value is represented by the binary number, the input value means a value obtained by converting a numerical value of 16 bits to 7 bits into a decimal number. As explained above, data[15:6] of the input value 129 (the decimal number) is 2. Similarly, when the input value is written as data[13:6], the input value means a value obtained by converting a numerical value of 14 bits to 7 bits into a decimal number. When the input value is written as data[14:7], the input value means a value obtained by converting a numerical value of 15 bits to 8 bits into a decimal number. When the input value is written as data[5:0], the input value means a value obtained by converting a numerical value of 6 bits to 1 bit into a decimal number.

In this way, when the index conversion circuitry 100 sets, as the index, the value based on the numerical value of high-order h1 digits to high-order h2 digits in the case in which the input value is arranged as the bit string, the index can be written as data[(h1−1):(h2−1)] of the input value.

For example, when the index conversion circuitry 100 sets data [15:6] of the input value as the index, if the input value is 0 to 63, the index is an index 0. If the input value is 64 to 127, the index is an index 1. If the input value is 128 to 191, the index is the index 2. If the input value is 192 to 255, the index is an index 3. That is, the index is represented by 10 bits. By using the index in this way, it is possible to further reduce the size of the look-up table 202 than directly setting the input value of 16 bits in the look-up table 202.

Next, the shift amount output by the index conversion circuitry 100 is explained in detail. As explained above, the index conversion circuitry 100 generates the shift amount on the basis of the numerical value of the low-order number of digits excluding the high-order predetermined number of digits used for the generation of the index. Specifically, the index conversion circuitry 100 generates the shift amount on the basis of a numerical value excluding high-order h1 digits to high-order h2 digits used for the generation of the index. That is, the index conversion circuitry 100 generates the shift amount on the basis of a numerical value of (h2−1) digits to one digit of the input value. More specifically, when the index is set as data[(h1−1):(h2−1)] of the input value, the shift amount is data[(h2−2):0] of the input value.

In this case, the interval D between entry points is the (h2−1)-th power of 2. In other words, the interval D between entry points is a value obtained by raising 2 to the power of (h2−1), which is a low-order number of digits. That is, the shift amount is in a range of 0 to {the (h2−1)-th power of 2−1}. Since the index is decided on the basis of the high-order predetermined number of digits in this way, it is possible to calculate the shift amount of the index from the entry point on the basis of the numerical value of the low-order number of digits.

For example, when h1=16 and h2=7, if the index is data[15:6] of the input value, as indicated by 30B, the shift amount is written as data[5:0] of the input value. In this case, the interval D between entry points is 64, which is the sixth power of 2. For example, if the input value is 195, the index conversion circuitry 100 represents the input value 195 as a bit string [0,0,0,0,0,0,0,0,1,1,0,0,0,0,1,1] (a binary number) of 16 digits, sets the index to 3 on the basis of a numerical value [0,0,0,0,0,0,0,0,1,1] (a binary number) of high-order 16 digits to 7 digits, converts a numerical value [0,0,0,0,1,1] (a binary number) of a low-order number of digits 6 excluding high-order 16 digits to 7 digits into a decimal number, and calculates the shift amount as 3. That is, the index conversion circuitry 100 calculates 3, which is data[5:0] of the input value 195, as the shift amount. The entry point in this case is 192.

If the input value 192 is represented by the bit string [0,0,0,0,0,0,0,0,1,1,0,0,0,0,0,0] (a binary number) of 16 digits, the index based on the numerical value [0,0,0,0,0,0,0,0, 1,1] (a binary number) of high-order 16 digits to 7 digits is 3. The shift amount based on the numerical value [0,0,0,0, 0,0] (a binary number) of the low-order number of digits 6 excluding high-order 16 digits to 7 digits is 0. As it is seen from the above, the entry point corresponds to the input value in which a numerical value of the low-order number of digits excluding the high-order predetermined number of digits is 0.

In this way, when data[5:0] of the input value is set as the shift amount, for example, if the input value is 0 to 63, the index is 0 and the shift amount is 0 to 63. Similarly, if the input value is 64 to 127, the index is 1 and the shift amount is 0 to 63. Similarly, if the input value is 128 to 191, the index is 2 and the shift amount is 0 to 63. Similarly, if the input value is 192 to 255, the index is 3 and the shift amount is 0 to 63. Numerical values, the shift amount of which corresponds to 0, are the entry points. The numerical values are respectively 0, 64, 128, 192, and the like.

Referring to Expression (2) again, when the index is set to data[(h1−1):(h2−1)] of the input value x, the interpolation circuitry 300 sets a term of 1/D to 1/{the (h2−1)-th power of 2} and performs calculation. As it is seen from this, shift operation of (h2−1) bits is possible. It is possible to further increase the speed of processing.

Note that the input value is represented as the bit string of the predetermined number of digits using the binary number. However, the input value is not limited to the binary number. The input value may be represented as the bit string of the predetermined number of digits using, for example, a quaternary number, an octal number, a decimal number, a hexadecimal number, and base 32.

For example, a value based on the numerical value of high-order h1 digits to high-order h2 digits of the input value (a decimal number) may be set as the index. That is, when the index is set to $data_{(10)}[(h1-1):(h2-1)]$ of the input value, the shift amount is $data_{(10)}[(h2-2):0]$ of the input value. In this case, the interval D between entry points is the (h2−1)-th power of 10.

For example, when h1=5 and h2=4, the index of 65535 (a decimal number) is $data_{(10)}[4:3]$ and $data_{(10)}[4:3]$ of 65535 (a decimal number) is 65. The shift amount is $data_{(10)}[2:0]$ of 65535 (a decimal number) and is 535. The interval D between entry points is the third power of 10 and is 1000.

As explained above, according to this embodiment, the index conversion circuitry 100 generates the index I1 on the basis of the numerical value of the high-order predetermined number of digits in the input value x and generates the shift amount Z on the basis of the numerical value of the low-order number of digits excluding the high-order predetermined number of digits. Consequently, after the look-up table 202 is recorded, it is possible to calculate f(x) through the linear interpolation using only the input value x. Therefore, determination processing for determining to which entry point interval the input value x corresponds, difference calculation for calculating a difference between the input value and the entry point, and the like are unnecessary. It is possible to further increase the speed of the calculation speed of the linear interpolation. Since the index, the data size of which is set smaller than the input value, is set in the look-up table 202, it is possible to further reduce the capacity of the look-up table 202.

(Second Embodiment)

The processing device 1 according to the first embodiment explained above generates the index according to the single index conversion characteristic on the basis of the input value. The processing device 1 according to a second embodiment is different from the processing device 1 according to the first embodiment in that the processing device 1 according to the second embodiment generates the index based on the input value using index conversion characteristics corresponding to groups divided according to the magnitude of the input value. Circuitry portions different from those in the first embodiment explained above are explained below.

Figure 4:
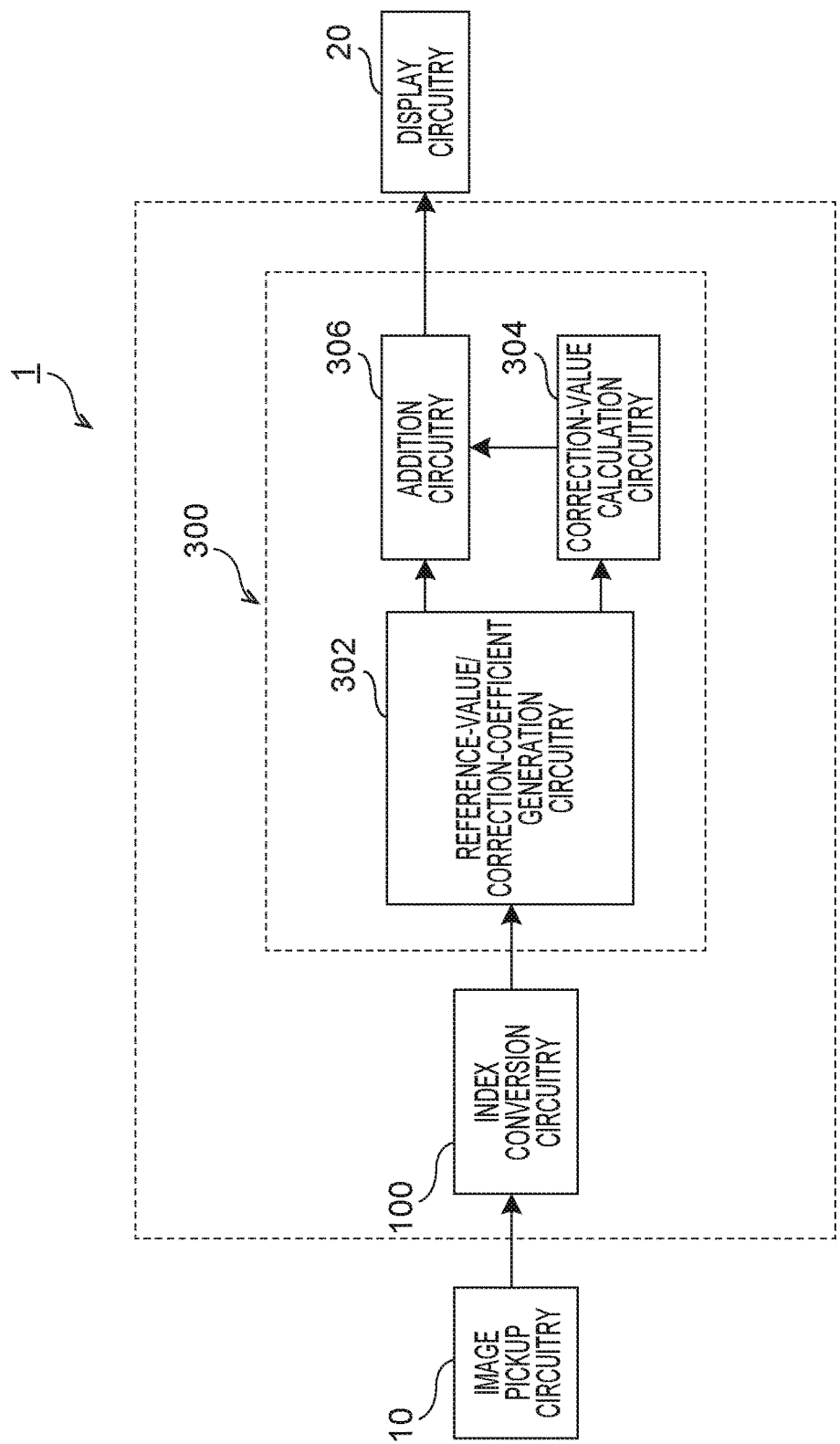
FIG. 4 is a block diagram showing a configuration example of a processing device according to a second embodiment.

First, components of the processing device 1 according to the second embodiment are explained on the basis of FIG. 4. FIG. 4 is a block diagram showing a configuration example of the processing device 1 according to the second embodiment. The processing device 1 shown in FIG. 4 includes the index conversion circuitry 100 and the interpolation circuitry 300. The index conversion circuitry 100 according to this embodiment is different from the index conversion circuitry 100 according to the first embodiment in that the index conversion circuitry 100 according to this embodiment generates the index based on the input value using a different index conversion characteristic according to the magnitude of the input value. The interpolation circuitry 300 according to this embodiment is different from the interpolation circuitry 300 according to the first embodiment in that the interpolation circuitry 300 according to this embodiment includes the storage circuitry 200 and performs linear interpolation on the basis of a normalized shift amount generated by the index conversion circuitry 100.

The index conversion circuitry 100 is a processor that generates a first index based on the input value and generates a shift amount having normalized magnitude using a different index conversion characteristic according to the magnitude of the input value. That is, the index conversion circuitry 100 generates the first index based on the input value and generates the shift amount having normalized magnitude using the index conversion characteristics corresponding to the groups divided according to the magnitude of the input value. More specifically, the index conversion circuitry 100 outputs the first index and the shift amounts with the normalized magnitude generated on the basis of the input value input from the image pickup circuitry 10 to the interpolation circuitry 300.

The interpolation circuitry 300 is a processor that outputs a linearly interpolated value of the input value on the basis of the first index and the normalized shift amount generated by the index conversion circuitry 100. More specifically, the interpolation circuitry 300 includes reference-value/correction-coefficient generation circuitry 302, correction-value calculation circuitry 304, and addition circuitry 306.

The reference-value/correction-coefficient generation circuitry 302 is a processor that is connected to the index conversion circuitry 100, the storage circuitry 200, the correction-value calculation circuitry 304, and the addition circuitry 306 and to which the first index and the normalized shift amount are input from the index conversion circuitry 100. That is, the reference-value/correction-coefficient generation circuitry 302 acquires, using the look-up table 202 of the storage circuitry 200, a first converted value corresponding to the first index and a second converted value corresponding to the second index adjacent to the first index and outputs the first converted value and a difference value between the first converted value and the second converted value. More specifically, the reference-value/correction-coefficient generation circuitry 302 outputs the first converted value corresponding to the first index to the addition circuitry 306 and outputs the difference value between the first converted value and the second converted value to the correction-value calculation circuitry 304.

The correction-value calculation circuitry 304 is a processor that is connected to the index conversion circuitry 100, the reference-value/correction-coefficient generation circuitry 302, and the addition circuitry 306 and to which the normalized shift amount is input from the index conversion circuitry 100 and the difference value is input from the reference-value/correction-coefficient generation circuitry 302. That is, the correction-value calculation circuitry 304 divides the normalized shift amount by a normalized interval between entry points, multiplies together this divided value and the difference value between the first converted value and the second converted value, and outputs a multiplied value to the addition circuitry 306 as a correction value.

The addition circuitry 306 is a processor that is connected to the reference-value/correction-coefficient generation circuitry 302, the correction-value calculation circuitry 304, and the display circuitry 20 and to which the first converted value is input from the reference-value/correction-coefficient generation circuitry 302 and the correction value is input from the correction-value calculation circuitry 304. That is, the addition circuitry 306 adds up the first converted value and the correction value and outputs an added-up value to the display circuitry 20 as a linearly interpolated value.

Figure 5:
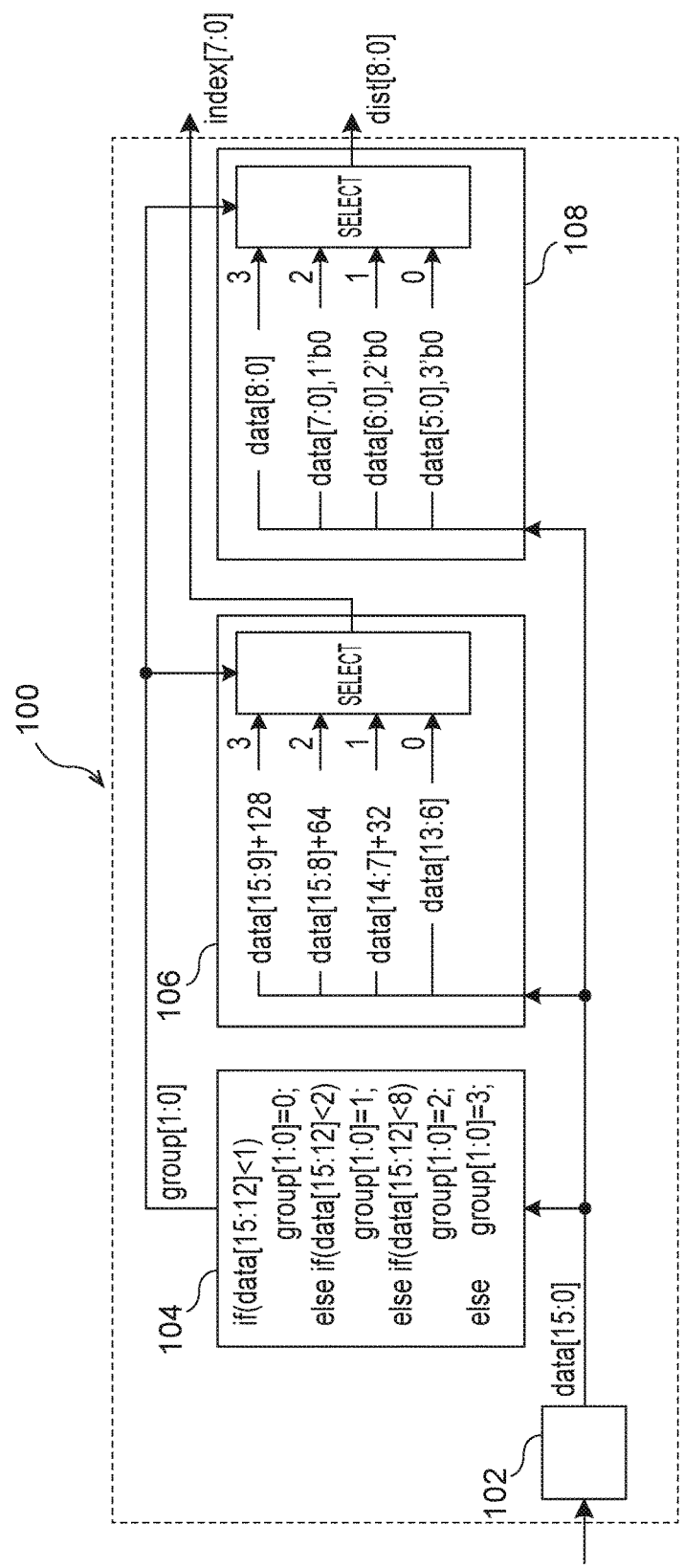
FIG. 5 is a block diagram showing the configuration of index conversion circuitry according to the second embodiment.

FIG. 5 is a block diagram showing the configuration of the index conversion circuitry 100 according to the second embodiment. A detailed configuration of the index conversion circuitry 100 according to the second embodiment is explained with reference to FIG. 5. As shown in FIG. 5, the index conversion circuitry 100 includes conversion circuitry 102, input-range determination circuitry 104, nonlinear-index generation circuitry 106, and correction-multiplier generation circuitry 108.

The conversion circuitry 102 converts the input value into, for example, a bit string of a binary number. Note that the conversion circuitry 102 may convert the input value into a quaternary number, an octal number, a decimal number, a hexadecimal number, base 32, and the like. Note that, when a decimal number is used as a bit string, the conversion circuitry 102 does not have to perform the conversion processing.

The input-range determination circuitry 104 determines, according to the magnitude of the input value, a group to which the input value belongs out of a plurality of groups determined in advance. The nonlinear-index generation circuitry 106 converts the input value into an index according to an index conversion characteristic corresponding to the group to which the input value belongs and outputs the index. The correction-multiplier generation circuitry 108 outputs, as a correction multiplier, a shift amount normalized by normalization processing corresponding to the group to which the input value belongs.

Next, the input-range determination circuitry 104 is explained in detail. The input-range determination circuitry 104 determines, according to the magnitude of the input value, the group to which the input value belongs out of four groups determined in advance.

Table 1 is a table indicating a relation between data[15:12] of the input value and a group name. As shown in Table 1, if data[15:12] of the input value is 0, the input-range determination circuitry 104 classifies the input value into a group 0. If data[15:12] of the input value is 1, the input-range determination circuitry 104 classifies the input value into a group 1. If data[15:12] of the input value is 2 to 7, the input-range determination circuitry 104 classifies the input value into a group 2. If data[15:12] of the input value is 8 to 15, the input-range determination circuitry 104 classifies the input value into a group 3. That is, if a range of the input value is 0 to 4095, the input-range determination circuitry 104 classifies the input value into the group 0. If the range of the input value is 4096 to 8191, the input-range determination circuitry 104 classifies the input value into the group 1. If the range of the input value is 8192 to 32767, the input-range determination circuitry 104 classifies the input value into the group 2. If the range of the input value is 32768 to 65535, the input-range determination circuitry 104 classifies the input value into the group 3.

TABLE 1

| group | Data[15:12] of the input value | Range of the input value Data[15:0] of the input value) |
|---|---|---|
| 0 | 0 | 0~4096 |
| 1 | 1 | 4096~8191 |
| 2 | 2~7 | 8192~32767 |
| 3 | 8~15 | 32768~65535 |

Next, the nonlinear-index generation circuitry 106 is explained in detail. When the nonlinear function shown in Expression (1) is linearly interpolated, there are a range of the input value x in which a change in the output value f(x) with respect to the input value x is large and a range of the input value x in which the change in the output value f(x) with respect to the input value x is small. In such a case, if the interval between entry points used for the linear interpolation is the same, it is likely that interpolation accuracy is deteriorated in the range of the input value x in which the change is large. On the other hand, it is likely that a computation amount is unnecessarily increased in the range of the input value x in which the change is small.

Therefore, the nonlinear-index generation circuitry 106 changes the index conversion characteristic to further increase the interval between entry points according to a decrease in a rate of the change of the output value f(x) with respect to the input value x. As explained above, when an upper digit of the input value is represented as h1 and a lower digit of the input value is represented as h2, the index can be represented as data[(h1−1):(h2−1)] of the input value. In this case, the interval D between entry points is the (h2−1)-th power of 2. As it is seen from this, when the lower digit h2 in calculating the index is changed, the interval D between entry points is changed.

Table 2 is a table showing a relation of a calculation formula of a group of the input value and an index.

TABLE 2

| group | Index calculation formula | Index output range | Interval between entry points |
|---|---|---|---|
| 0 | data[13:6] | 0~63 | 64 |
| 1 | data[14:7] + 32 | 64~95 | 128 |
| 2 | data[15:8] + 64 | 96~191 | 256 |
| 3 | data[15:9] + 128 | 192~255 | 512 |

As shown in Table 2, the nonlinear-index generation circuitry 106 sets the calculation formula of the index to data[13:6] in the group 0, data[14:7]+32 in the group 1, data[15:8]+64 in the group 2, and data[13:9]+128 in the group 3. That is, the nonlinear-index generation circuitry 106 sets the interval between entry points to 64, which is the sixth power of 2, in the group 0, 128, which is the seventh power of 2, in the group 1, 256, which is the eighth power of 2, in the group 2, and 512, which is the ninth power of 2, in the group 3.

Figure 6:
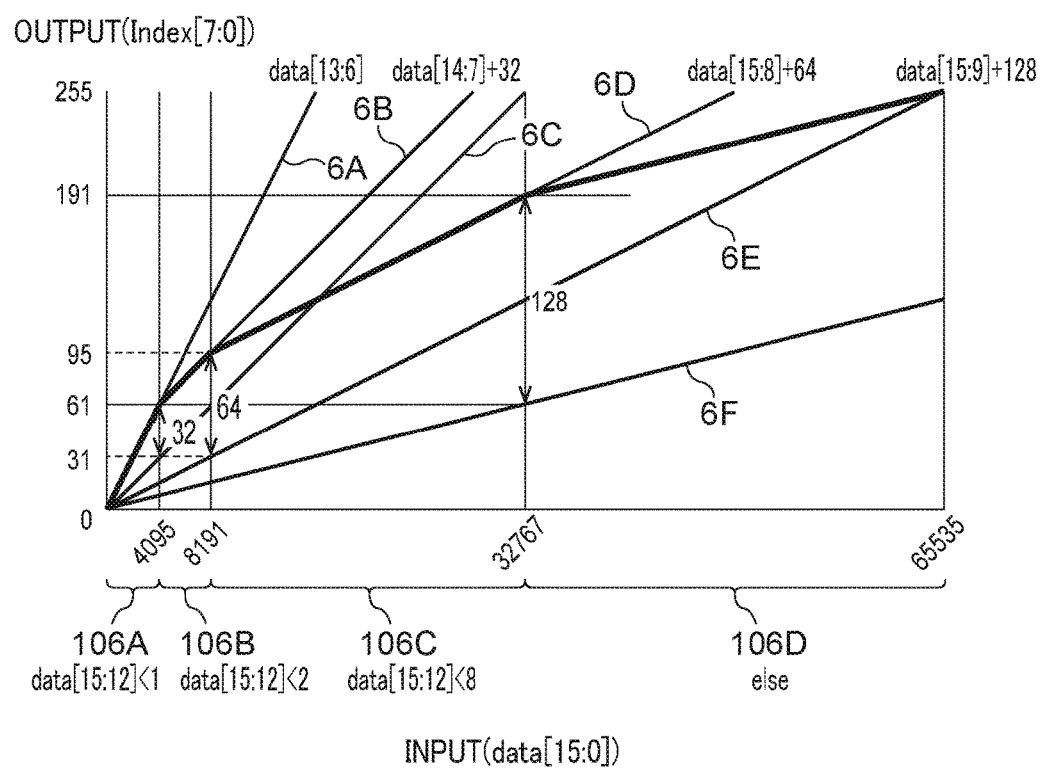
FIG. 6 is a diagram showing a relation between an input value and an index.

The calculation formula of the index is explained with reference to FIG. 6. FIG. 6 is a diagram showing a relation between the input value and the index. The horizontal axis indicates the input value and the vertical axis indicates the index. In FIG. 6, 6A indicates data[13:6] of the input value, 6B indicates data[14:7]+32 of the input value, 6C indicates data[14:7] of the input value, 6D indicates data[15:8]+64 of the input value, 6E indicates data[15:9]+128 of the input value, and 6F indicates data[15:9] of the input value. 106A indicates a range of the input value of the group 1, 106B indicates a range of the input value of the group 2, 106C indicates a range of the input value of the group 3, and 106D indicates a range of the input value of the group 4.

Intervals between entry points of respective data[13:6] of the input value indicated by 6A, data[14:7] of the input value indicated by 6C, data[15:8] of the input value indicated by 6E, and data[15:9] of the input value indicated by 6F are 64, 128, 256, and 512. As it is seen from this, the number of generated indexes increases with respect to the same range of the input value as the interval between entry points decreases.

For example, when the numbers of indexes generated in the range of the input value 0 to 4095 are compared, the number of indexes in data[13:6] of the input value indicated by 6A is 63, the number of indexes in data[14:7] of the input value indicated by 6C is 31, the number of indexes in data[15:8] of the input value indicated by 6E is 15, and the number of indexes in data[15:9] of the input value indicated by 6F is 7. Therefore, if the calculation formula of the index is data[13:6] indicated by 6A in the group 0, data[13:6] cannot be connected to data[14:7] indicated by 6C to continuously generate indexes unless 32 is added. Therefore, the calculation formula of the index is data[14:7]+32 indicated by 6B in the group 0. Similarly, in the group 1, if the calculation formula of the index is data[14:7]+32 indicated by 6B, data[14:7]+32 cannot be connected to data[15:8] indicated by 6E to continuously generate indexes unless 64 is added. Therefore, the calculation formula of the index is data[15:8]+64 indicated by 6D in the group 2. Similarly, in the group 2, if the calculation formula of the index is data[15:8]+64 indicated by 6D, data[15:8]+64 cannot be connected to data[15:9] indicated by 6F to continuously generate indexes unless 128 is added. Therefore, the calculation formula of the index is data[15:9]+128 indicated by 6E in the group 3. Since the calculation formula added with a predetermined constant is used for each of the groups in this way, even if the interval between entry points of each of the groups is different, it is possible to generate indexes as continuous numerical values in all the ranges of the input value.

Referring back to FIG. 5, the correction-multiplier generation circuitry 108 is explained in detail. Table 3 is a table showing a relation between the group and the shift amount.

TABLE 3

| group | Shift amount | Correction multiplier calculation formula | Correction multiplier output value range |
| --- | --- | --- | --- |
| 0 | data[5:0] | data[5:0] << 3 | 0~511 |
| 1 | data[6:0] | data[6:0] << 2 | 0~511 |
| 2 | data[7:0] | data[7:0] << 1 | 0~511 |
| 3 | data[8:0] | data[8:0] | 0~511 |

As explained above, when the upper digit of the input value is represented as h1 and the lower digit of the input value is represented as h2, the index can be represented as data[(h1−1):(h2−1)] of the input value. In this case, the shift amount is data[(h2−2):0]. That is, the shift amount of the group 0 is data[5:0] because h2 is 7. A maximum value of the shift amount is 63. Similarly, the shift amount of the group 1 is data[6:0] because h2 is 8. A maximum value of the shift amount is 127. Similarly, the shift amount of the group 2 is data[7:0] because h2 is 9. A maximum value of the shift amount is 255. The shift amount of the group 3 is data[8:0] because h2 is 10. A maximum value of the shift amount is 511.

In this embodiment, in order to reduce the size of a circuitry configuration of the correction-value calculation circuitry 304 explained below, the magnitude of the shift amount input to the correction-value calculation circuitry 304 is normalized. That is, a range of the correction value input to the correction-value calculation circuitry 304 is unified by normalizing a range of the shift amount input to the correction-value calculation circuitry 304. Specifically, the correction-multiplier generation circuitry 108 normalizes ranges of the shift amounts of the other groups to be matched with a range of the shift amount of the group 3.

For example, in the group 0, data[5:0]<<3 is used as a correction multiplier calculation formula. Specifically, the correction-multiplier generation circuitry 108 shifts data[5:0] by 3 bits in the case of the group 0. Consequently, the normalized range of the shift amount, that is, a correction multiplier output value range is normalized to 0 to 511.

Similarly, in the group 1, data[6:0]<<2 is used as the correction multiplier calculation formula. Specifically, the correction-multiplier generation circuitry 108 shifts data[6:0] by 2 bits in the case of the group 0. Consequently, the normalized range of the shift amount, that is, the correction multiplier output value range is normalized to 0 to 511.

Similarly, in the group 2, data[7:0]<<1 is used as the correction multiplier calculation formula. Specifically, the correction-multiplier generation circuitry 108 shifts data[7:0] by 1 bit in the case of the group 0. Consequently, the normalized range of the shift amount, that is, the correction multiplier output value range is normalized to 0 to 511.

Figure 7:
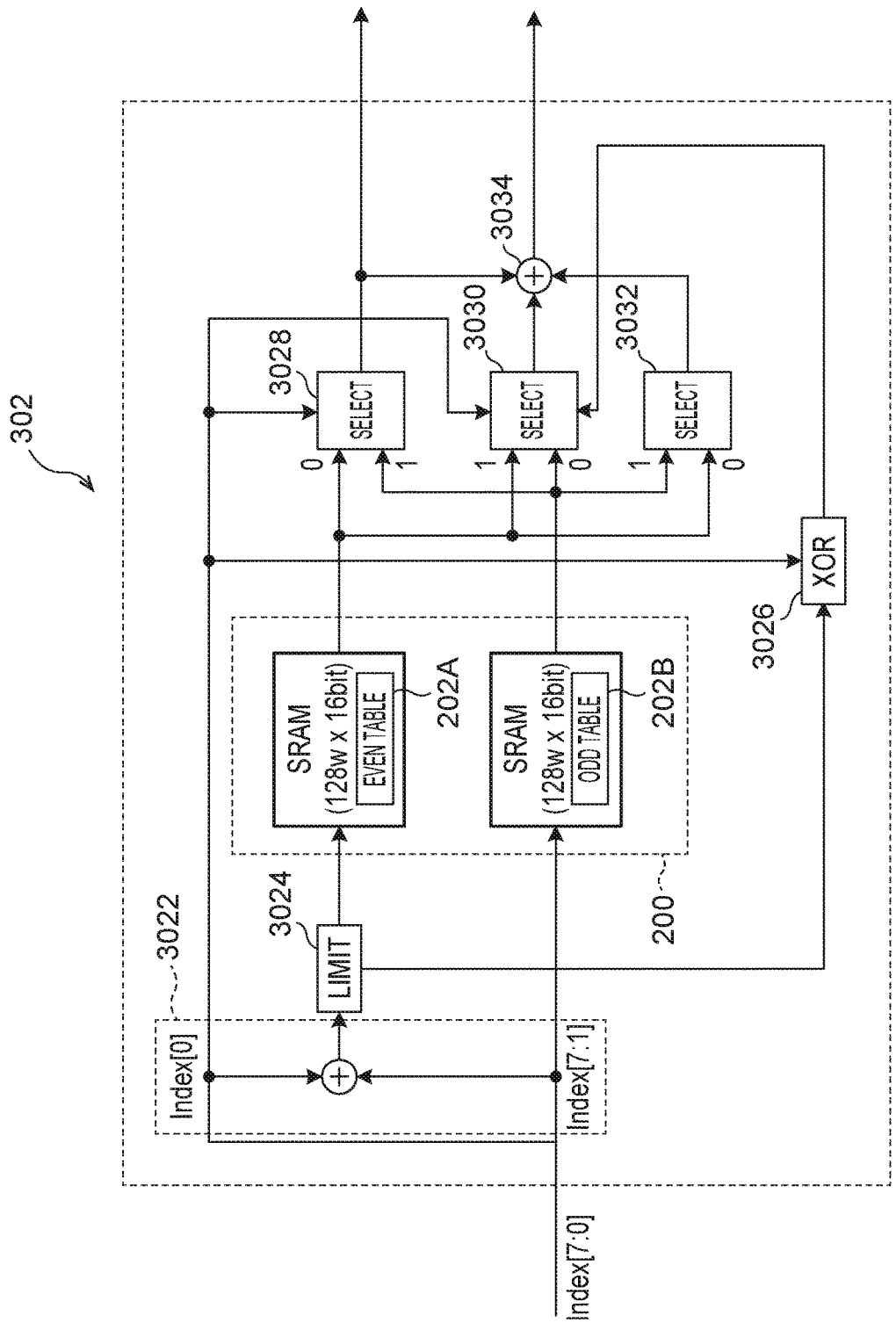
FIG. 7 is a block diagram showing the configuration of reference-value/correction-coefficient generation circuitry.

FIG. 7 is a block diagram showing the configuration of the reference-value/correction-coefficient generation circuitry 302. A detailed configuration of the reference-value/correction-coefficient generation circuitry 302 is explained with reference to FIGS. 7 and 8. As shown in FIG. 7, the reference-value/correction-coefficient generation circuitry 302 includes the storage circuitry 200, address conversion circuitry 3022, index-upper-limit detection circuitry 3024, bit inversion circuitry 3026, first reference-value selection circuitry 3028, second reference-value selection circuitry 3030, third reference-value selection circuitry 3032, and difference calculation circuitry 3034.

Figure 8:
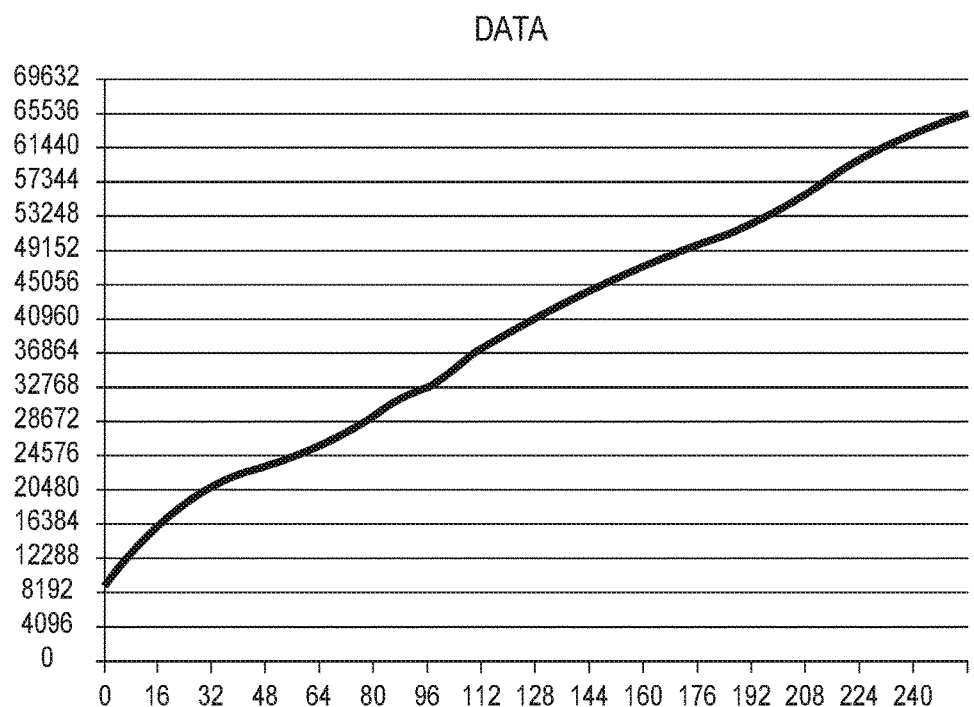
FIG. 8 is a diagram showing a relation between a converted value and an index set in a gamma correction table for index.

FIG. 8 is a diagram showing a relation between a converted value and an index set in a gamma correction table for index 202. The horizontal axis indicates the index and the vertical axis indicates the converted value. The converted value equivalent to the gamma characteristic shown in FIG. 2 is set.

As shown in FIG. 7, the storage circuitry 200 is configured by, for example, an SRAM. The storage circuitry 200 stores a gamma correction table for even number index 202A and a gamma correction table for odd number index 202B. In the gamma correction table for even number index 202A, converted values of entry points corresponding to even number index numbers, that is, even numbers of indexes 0 to 254 (FIG. 8) are downloaded and stored in advance in order from an address number 0 to an address number 127. The converted values are gamma correction reference values and are f(x) indicated by Expression (1).

On the other hand, in the gamma correction table for odd number index 202B, converted values of entry points corresponding to odd number index numbers, that is, odd numbers of indexes 1 to 255 (FIG. 8) are downloaded and stored in advance in order from the address number 0 to the address number 127.

The address conversion circuitry 3022 calculates a value obtained by adding up Index[7:1] of the index and Index[0] of the index. A range of the index is 0 to 255. The index can be written as Index[7:0]. That is, Index[7:0] means a numerical value obtained by converting a numerical value of 8 bits to 1 bit of the index into a decimal number.

For example, if the index is 193, the index is calculated as 193 (a decimal number) on the basis of a numerical value [1,1,0,0,0,0,1,1] (a binary number) of high-order 8 digits to 1 digit represented by a bit string of eight digits [1,1,0,0,0,0,1,1] (a binary number). Similarly, when the index is written as Index[7:1], for example, if the index is 193, the index is calculated as 96 (a decimal number) on the basis of a numerical value [1,1,0,0,0,0,0] (a binary number) of high-order 8 digits to 2 digits represented by a bit string of 8 digits [1,1,0,0,0,0,0,1] (a binary number). Similarly, when the index is written as Index[0:0]=Index[0], for example, if the index is 193, the index is calculated as 1 (a decimal number) on the basis of a numerical value [1] (a binary number) of high-order 1 digit to 1 digit represented by a bit string of 1 digit [1] (a binary number). That is, Index[0] is 1 if the input value is an odd number. Index[0] is 0 if the input value is an even number. Consequently, in the address conversion circuitry 3022, the index 193 (a decimal number) is output as 96+1=97.

Similarly, when the index is, for example, 0, 1, 2, 3, 4, 5, 6, 7, or 8, Index[0] is 0, 1, 0, 1, 0, 1, 0, 1, 0, Index[7:1] is 0, 0, 1, 1, 2, 2, 3, 3, 4, and an added-up value is 0, 1, 1, 2, 2, 3, 3, 4, 4. As it is seen from this, in the case of an even number index number, a value output by the address conversion circuitry 3022 is equal to a value of Index[7:1].

On the other hand, in the case of an odd number index number, a value output by the address conversion circuitry 3022 is a value obtained by adding 1 to Index[7:1]. In other words, the address conversion circuitry 3022 outputs a value equivalent to a value obtained by dividing the index by 2 and rounding up a number after the decimal point. For example, when indexes 250, 251, 252, 253, 254, 255, and 256 (decimal numbers) are divided by 2 and numbers after the decimal point are rounded up, 125, 126, 126, 127, 127, 128, and 128 are obtained. That is, the address conversion circuitry 3022 outputs 125, 126, 126, 127, 127, 128, and 128 with respect to the indexes 250, 251, 252, 253, 254, 255, and 256 (decimal numbers).

As it is seen from the above, when the input value is an even number, an address input to the gamma correction table for even number index 202A is the same number as an address input to the gamma correction table for odd number index 202B. In this case, as the indexes corresponding to the addresses, the index registered in the gamma correction table for even number index 202A is a value smaller than the index registered in the gamma correction table for odd number index 202B by 1.

On the other hand, when the input value is an odd number, an address input to the gamma correction table for even number index 202A is larger than an address input to the gamma correction table for odd number index 202B by 1. In this case, as the indexes corresponding to the addresses, the index registered in the gamma correction table for even number index 202A is a value larger than the index registered in the gamma correction table for odd number index 202B by 1.

When the value output by the address conversion circuitry 3022 does not exceed an upper limit of an index number, that is, when an addition result is in a range of 0 to 127, the index-upper-limit detection circuitry 3024 directly outputs, as the address of the gamma correction table for even number index 202A, the value output by the address conversion circuitry 3022. When the value output by the address conversion circuitry 3022 does not exceed the upper limit of the index number, the index-upper-limit detection circuitry 3024 outputs, as last index information, 0 to the bit inversion circuitry 3026 as a value indicating that the index number is not a last index number.

On the other hand, when the value output by the address conversion circuitry 3022 exceeds the upper limit of the index number, that is, when an addition result is 128, the index-upper-limit detection circuitry 3024 outputs a last storage address, that is, 127 as the address of the gamma correction table for even number index 202A. When the value output by the address conversion circuitry 3022 exceeds the upper limit of the index number, the index-upper-limit detection circuitry 3024 outputs, as the last index information, a value (1) indicating that the index number is the last index number to the bit inversion circuitry 3026. Index[7:1] of the index is used as the address of the gamma correction table for odd number index 202B as well.

When low-order 1 bit Index[0] of the index is a value 0, that is, an even number, the first reference-value selection circuitry 3028 outputs, as a converted value, reference value data output by the gamma correction table for even number index 202A. On the other hand, when low-order 1 bit Index[0] of the index is a value 1, that is, an odd number, the first reference-value selection circuitry 3028 outputs, as the converted value, reference value data output by the gamma correction table for odd number index 202B.

When the last index information is the value 0 indicating that the index number is not the last index number, the bit inversion circuitry 3026 directly outputs a value of a signal. When the last index information is the value (1) indicating that the index number is the last index number, the bit inversion circuitry 3026 outputs the value 0.

When the signal output by the bit inversion circuitry 3026 is the value 0, the second reference-value selection circuitry 3030 outputs the converted value of the gamma correction table for odd number index 202B. On the other hand, when the signal is the value 1, the second reference-value selection circuitry 3030 outputs the converted value output by the gamma correction table for even number index 202A. That is, when Index[7:0] of the index input from the terminal 204 is not the last index number, the second reference-value selection circuitry 3030 outputs a converted value, which is a setting value of an entry point corresponding to the next index number of Index[7:0] of the index. When Index[7:0] of the index input from the terminal is the last index number, the second reference-value selection circuitry 3030 outputs a converted value, which is a setting value of an entry point corresponding to an index number of Index[7:0] of the index.

When the signal output by the bit inversion circuitry 3026 is the value 0, the third reference-value selection circuitry 3032 outputs the converted value output by the gamma correction table for even number index 202A. On the other hand, when the signal is the value 1, the third reference-value selection circuitry 3032 outputs the converted value output by the gamma correction table for odd number index 202B. That is, the Index[7:0] of the index input from the terminal is not the last index number, the third reference-value selection circuitry 3032 outputs the converted value, which is the setting value of the entry point corresponding to the index number of Index[7:0] of the index. When Index[7:0] of the index input from the terminal is the last index number, the third reference-value selection circuitry 3032 outputs a converted value, which is a setting value of an entry point corresponding to an index number immediately preceding Index[7:0] of the index.

The difference calculation circuitry 3034 calculates a value obtained by subtracting the value output by the third reference-value selection circuitry 3032 from the value output by the second reference-value selection circuitry 3030 and outputs the value to the terminal as a correction coefficient. That is, when Index[7:0] of the index input from the terminal is not the last index number, the difference calculation circuitry 3034 outputs a value obtained by subtracting the converted value, which is the setting value of the entry point corresponding to the index number of Index[7:0] of the index, from the converted value, which is the setting value of the entry point corresponding to the next index number of Index[7:0] of the index, to the terminal as the correction coefficient.

When Index[7:0] of the index input from the terminal is the last index number, the difference calculation circuitry 3034 calculates a value obtained by subtracting the converted value, which is the setting value of the entry point corresponding to the index number immediately preceding Index[7:0] of the index, from the converted value, which is the setting value of the entry point corresponding to the index number of Index[7:0] of the index, and outputs the value to the terminal as the correction coefficient.

Figure 9:
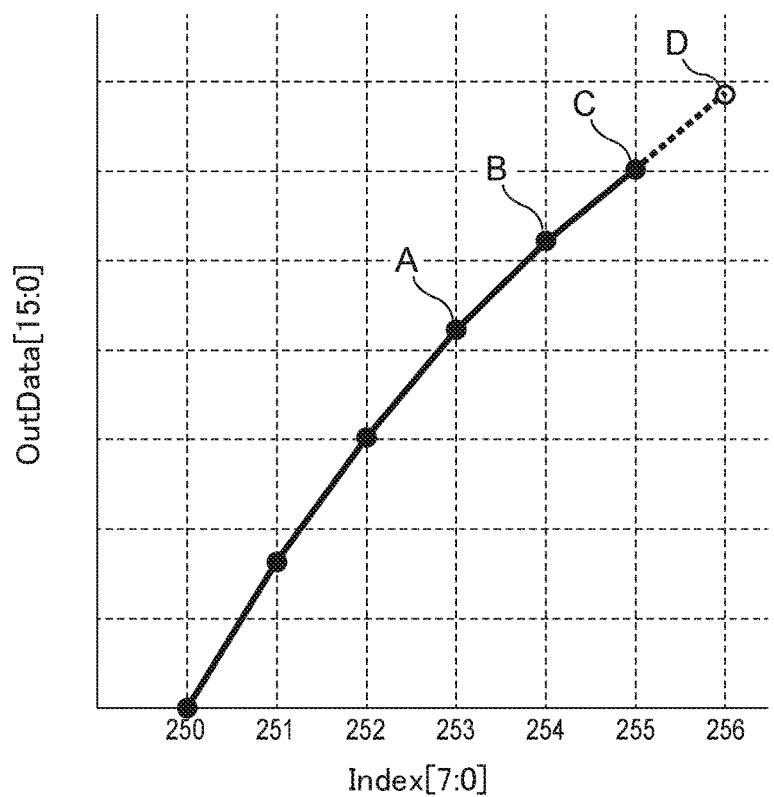
FIG. 9 is a diagram showing a relation between interpolation and extrapolation of linear interpolation.

The operation of the difference calculation circuitry 3034 is explained more in detail with reference to FIG. 9. FIG. 9 is a diagram showing a relation between interpolation and extrapolation of linear interpolation. The horizontal axis indicates an index and the vertical axis indicates OutData, which is a linear interpolation value. Points A, B, C, and D respectively correspond to the indexes 253, 254, 255, and 256.

When the input value x is 655024 to 65535, the index is 255 and the index 256 is absent. Therefore, when the input value x is 655024 to 65535, the difference calculation circuitry 3034 performs the linear interpolation according to extrapolation. Specifically, when the index is 255, the difference calculation circuitry 3034 subtracts a converted value corresponding to the index 254 from a converted value corresponding to the index 255. The difference calculation circuitry 3034 linearly interpolates the input value 655024 to 65535 on the basis of this difference value.

On the other hand, when the input index is smaller than 255, the difference calculation circuitry 3034 performs the linear interpolation according to interpolation. For example, when the address conversion circuitry 3022 outputs 127 with respect to the input value 253, the address 127 of the gamma correction table for even number index 202A corresponds to the index 254 and the address 126 of the gamma correction table for odd number index 202B corresponds to the index 253. Therefore, the difference calculation circuitry 3034 subtracts the converted value corresponding to the index 253 from the converted value corresponding to the index 254. That is, interpolation between the index 253 and the index 254 is performed by a calculation circuitry of the interpolation circuitry 300.

For example, when the address conversion circuitry 3022 outputs 127 with respect to the index 254, the address 127 of the gamma correction table for even number index 202A corresponds to the index 254 and the address 127 of the gamma correction table for odd number index 202B corresponds to the index 255. Therefore, the difference calculation circuitry 3034 subtracts the converted value corresponding to the index 254 from the converted value corresponding to the index 255. That is, interpolation between the index 254 and the index 255 is performed by the calculation circuitry of the interpolation circuitry 300. In this way, in this embodiment, in normal processing, interpolation is performed. Extrapolation is performed for a maximum value of the index. Consequently, the linear interpolation is also possible for the maximum value of the index. For example, even when the converted value of the index 256 is not stored, the linear interpolation of the input value 655024 to 65535 is possible.

Figure 10:
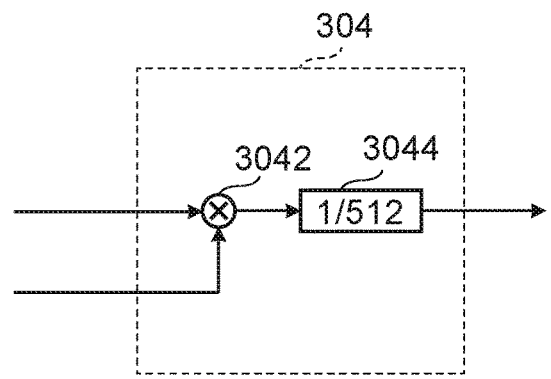
FIG. 10 is a block diagram showing a configuration example of correction-value calculation circuitry.

FIG. 10 is a block diagram showing a configuration example of the correction-value calculation circuitry 304. A detailed configuration of the correction-value calculation circuitry 304 is explained with reference to FIGS. 4 and 10. The correction-value calculation circuitry 304 includes multiplication circuitry 3042 and bit-shift circuitry 3044.

The multiplication circuitry 3042 performs multiplication of the correction coefficient output by the reference-value/correction-coefficient generation circuitry 302 and the correction multiplier output by the correction-value calculation circuitry 304 and outputs a multiplication result. The bit-shift circuitry 3044 performs bit-shift on the multiplication result input from the multiplication circuitry 3042 and outputs a value obtained by dividing the multiplication result by 512, that is, a value of 1/512 of the multiplication result as a correction value of a converted value. The converted value is a converted value of an entry point corresponding to an index number indicated by Index[7:0].

Figure 11:
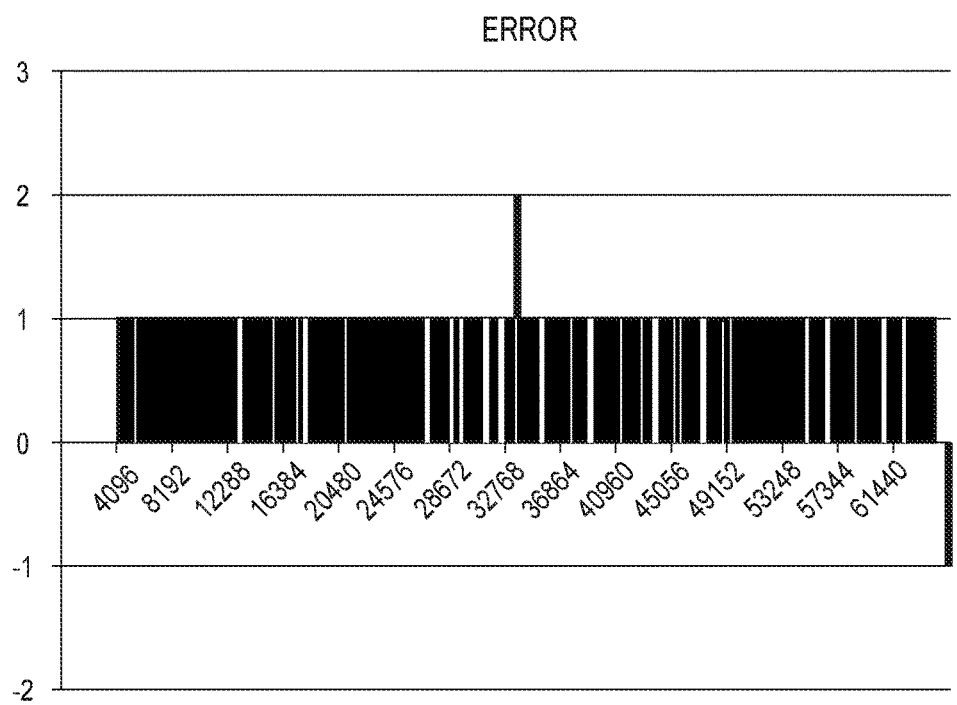
FIG. 11 is a diagram showing an example of an error distribution of gamma correction by gamma correction processing according to a second embodiment.

FIG. 11 is a diagram showing an example of an error distribution of gamma correction by gamma correction processing according to the second embodiment. The horizontal axis indicates an input value and the vertical axis indicates an error. As it is seen from the figure, error values are generally equal to or smaller than 1. That is, according to this embodiment, calculation accuracy is maintained while achieving an increase in the speed of processing.

As explained above, according to this embodiment, the index conversion circuitry 100 generates the index based on the input value using the index conversion characteristics corresponding to the groups divided according to the magnitude of the input value. Consequently, it is possible to change the interval between the entry points in the range of the input value x in which the change in the output value f(x) with respect to the input value x is large and the range of the input value x in which the change in the output value f(x) with respect to the input value x is small. Therefore, it is possible to improve interpolation accuracy in the range of the input value x in which the change in the output value f(x) with respect to the input value x is large. On the other hand, it is possible to reduce a computation amount while maintaining the interpolation accuracy in the range of the input value x in which the change in the output value f(x) with respect to the input value x is small.

(Modification 1)

Figure 12:
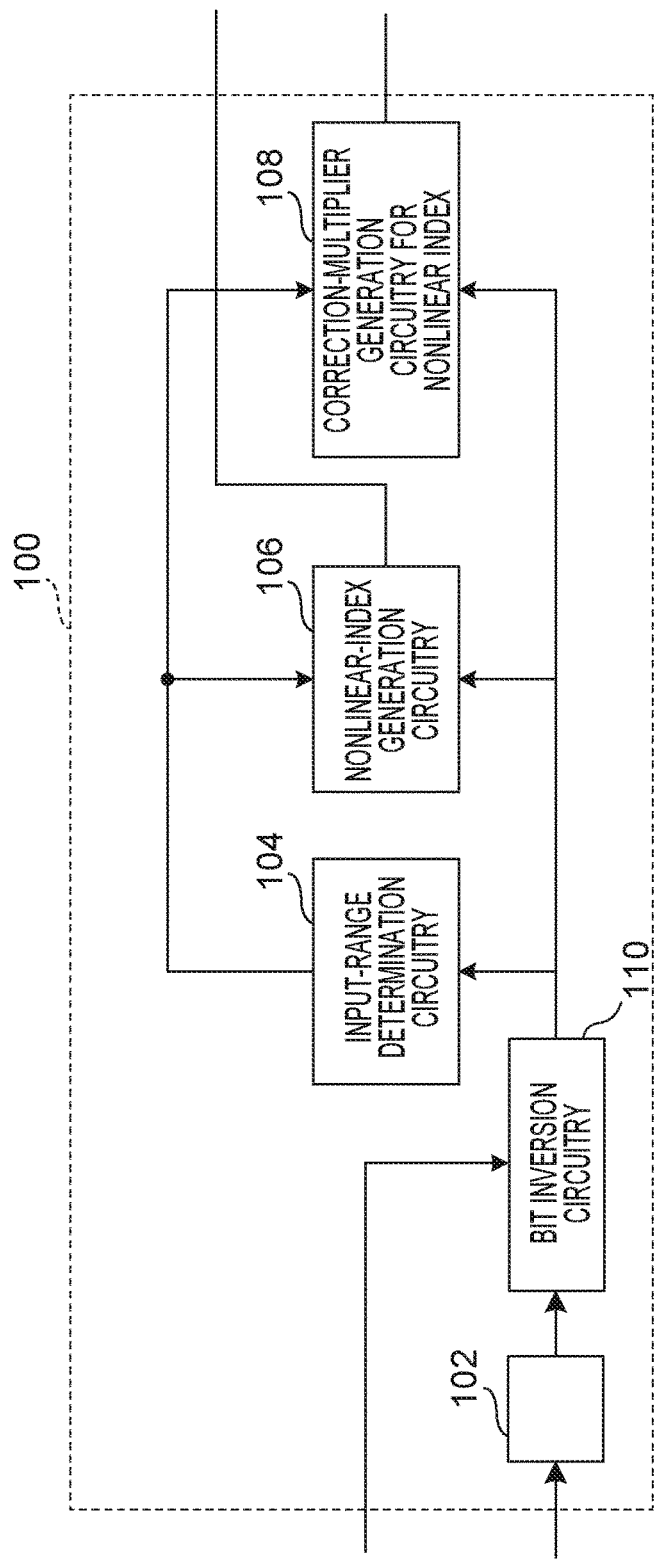
FIG. 12 is a block diagram showing the configuration of index conversion circuitry according to a modification 1.

FIG. 12 is a block diagram showing the configuration of the index conversion circuitry 100 according to a modification 1. The index conversion circuitry 100 according to the modification 1 is different from the index conversion circuitry 100 according to the second embodiment in that the index conversion circuitry 100 according to the modification 1 further includes a second bit inversion circuitry 110.

Circuitry portions different from those of the index conversion circuitry 100 according to the second embodiment are explained below. Explanation of the other components is omitted because the other components are the same as the components of the processing device 1 according to the second embodiment.

The second bit inversion circuitry 110 outputs a value obtained by inverting a value of all bits of an input value data[15:0] according to a control signal received from not-shown external circuitry control circuitry via a terminal. That is, the second bit inversion circuitry 110 converts the input value into a binary number and performs bit inversion.

Table 4 is a table showing a relation between data[15:12] of an input value and a group name in the case in which the second bit inversion circuitry 110 is used. Consequently, as explained below, the input-range determination circuitry 104 detects a group to which the input value belongs.

TABLE 4

| group | Data[15:12] of the input value | Data[15:0] of the input value |
|---|---|---|
| 0 | 15 | 65535~61440 |
| 1 | 14 | 61439~57344 |
| 2 | 13~8 | 57343~32768 |
| 3 | 7~0 | 32767~0 |

The nonlinear-index generation circuitry 106 outputs an index on the basis of data obtained by bit-inverting a value of the input value.

Figure 13:
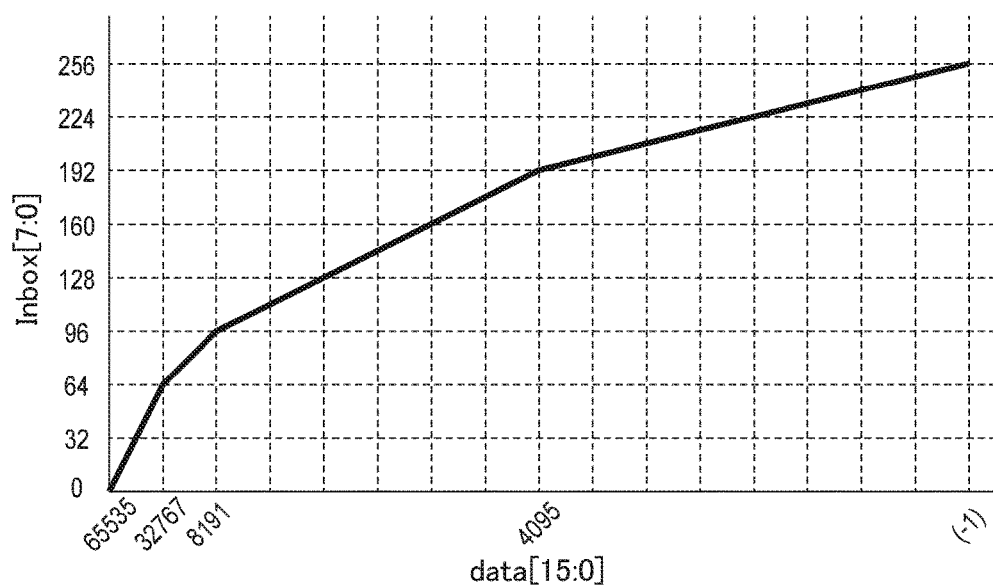
FIG. 13 is a block diagram showing a relation between an input value and an index in the case in which bit inversion circuitry is used.

FIG. 13 is a diagram showing a relation between an input value and an index in the case in which the second bit inversion circuitry 110 is used. Note that, although a value of (−1) on the horizontal axis is described for convenience of a scale of the figure, the value is absent as a value of the input value data[15:6].

As explained above, in the processing device 1 according to the modification 1, the index conversion circuitry 100 further includes the second bit inversion circuitry 110. Consequently, the linear interpolation is also possible for a bit-inverted input value.

(Modification 2)

Figure 14:
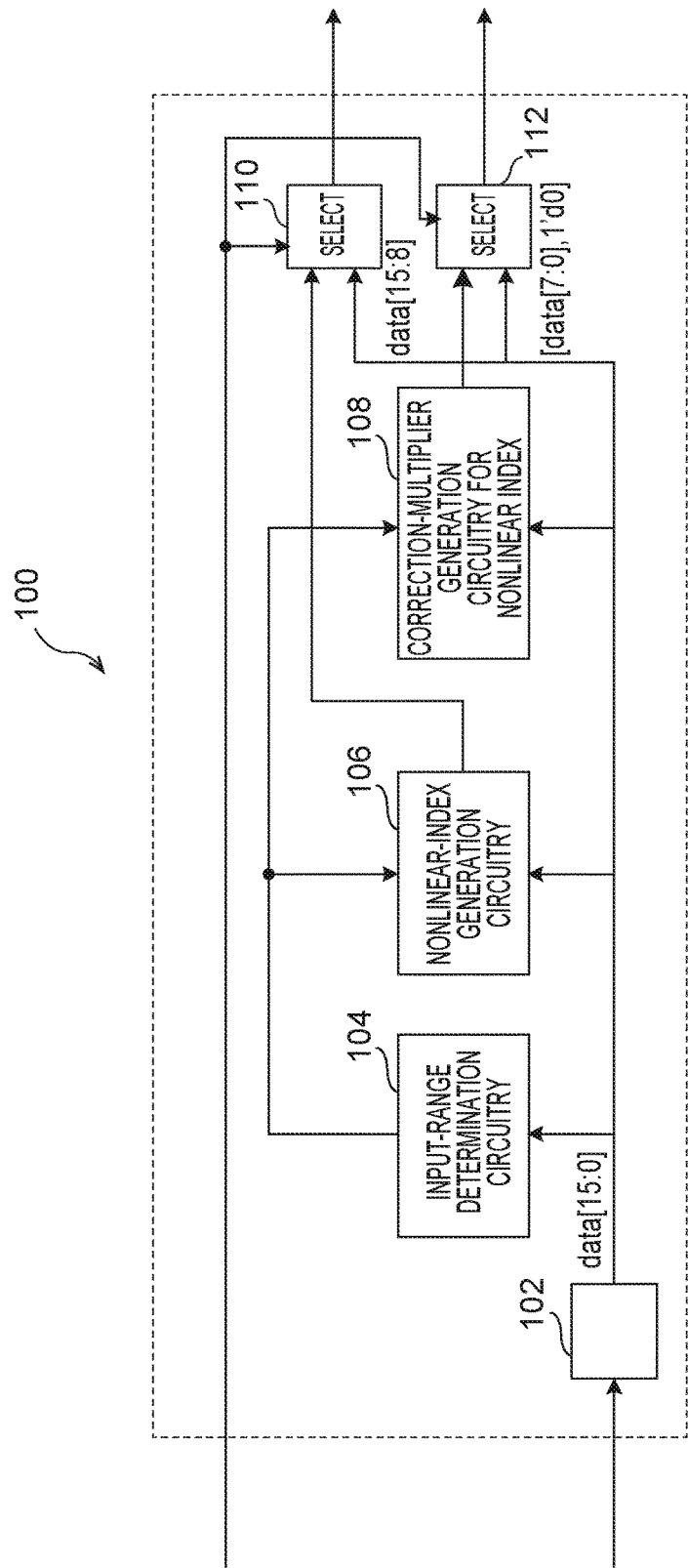
FIG. 14 is a block diagram showing the configuration of index conversion circuitry according to a modification 2.

FIG. 14 is a block diagram showing the configuration of the index conversion circuitry 100 according to a modification 2. The index conversion circuitry 100 according to the modification 2 is different from the index conversion circuitry 100 according to the second embodiment in that the index conversion circuitry 100 according to the modification 2 further includes selection circuitry 110 and selection circuitry 112. Circuitry portions different from those of the index conversion circuitry 100 according to the second embodiment are explained below. Explanation of the other components is omitted because the other components are the same as the components of the processing device 1 according to the second embodiment.

The selection circuitry 110 selects high-order 8 bits data [15:8] of an input value data[15:0] as an index and outputs the index according to a control signal received from not-shown external circuitry control circuitry via a terminal. The selection circuitry 112 outputs, as a correction multiplier, a value obtained by doubling and normalizing low-order 8 bits data[7:0] of the input value data[15:0] according to a control signal received from the external circuitry control circuitry via the terminal.

As explained above, in the processing device 1 according to the modification 2, the index conversion circuitry 100 further includes the selection circuitry 110 and the selection circuitry 112. Consequently, it is possible to select a case in which the index conversion circuitry 100 generates an index based on an input value using index conversion characteristics corresponding to groups divided according to the magnitude of the input value and a case in which the index conversion circuitry 100 generates the index based on the input value using a single index conversion characteristic. Therefore, it is possible to perform liner interpolation corresponding to a characteristic of the input value x.

(Modification 3)

Figure 15:
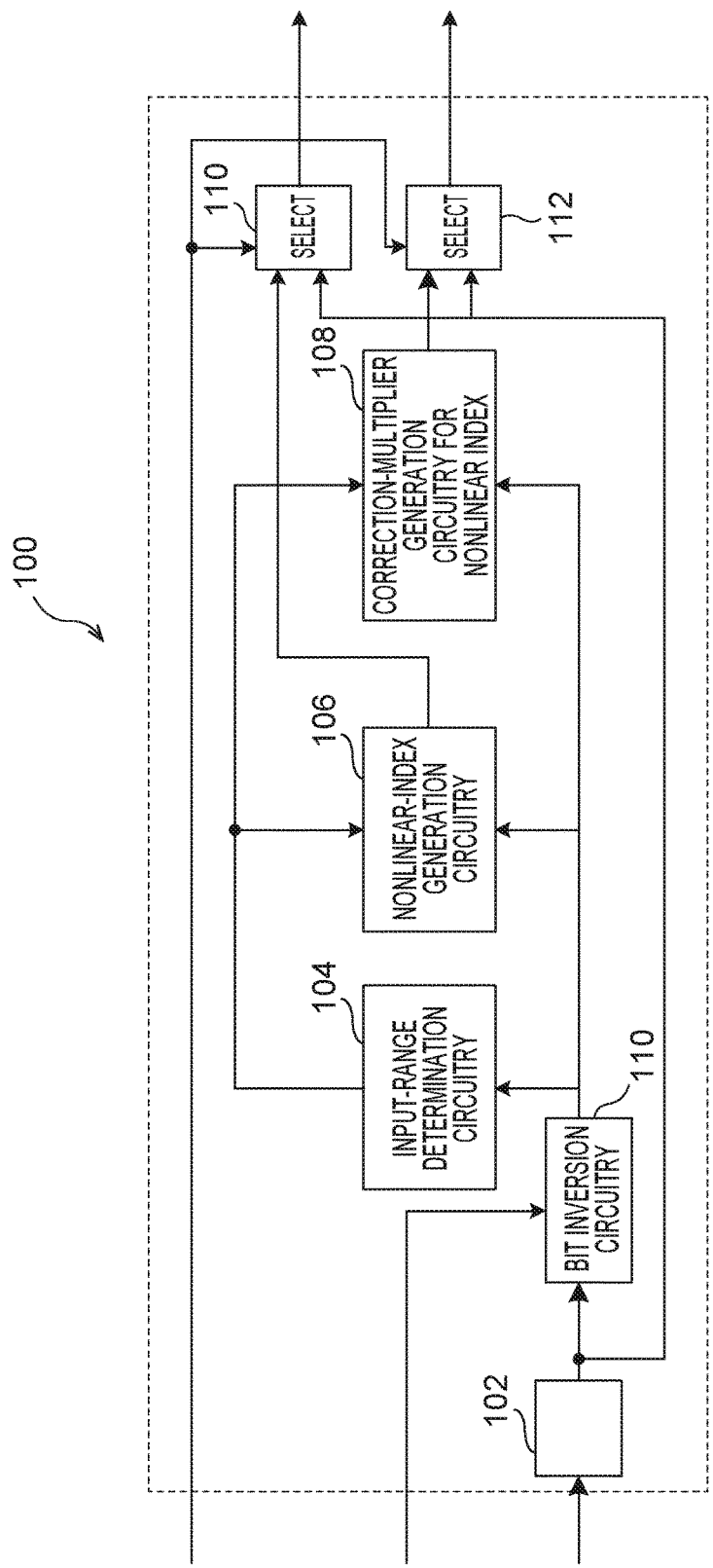
FIG. 15 is a block diagram showing the configuration of index conversion circuitry according to a modification 3.

FIG. 15 is a block diagram showing the configuration of the index conversion circuitry 100 according to a modification 3. The index conversion circuitry 100 according to the modification 3 is different from the index conversion circuitry 100 according to the modification 1 in that the index conversion circuitry 100 according to the modification 3 further includes the selection circuitry 110 and the selection circuitry 112. Circuitry portions different from those of the index conversion circuitry 100 according to the modification 1 are explained below. Explanation of the other components is omitted because the other components are the same as the components of the processing device 1 according to the modification 1.

The selection circuitry 110 selects high-order 8 bits data [15:8] of the input value data[15:0] as an index and outputs the index according to a control signal received from not-shown external circuitry control circuitry via a terminal. The selection circuitry 112 outputs, as a correction multiplier, a value obtained by doubling and normalizing low-order 8 bits data[7:0] of the input value data[15:0] according to a control signal received from the external circuitry control circuitry via the terminal.

As explained above, in the processing device 1 according to the modification 3, the index conversion circuitry 100 further includes the selection circuitry 110 and the selection circuitry 112. Consequently, it is possible to select, according to a characteristic of the bit-inverted input value X, a case in which the index conversion circuitry 100 generates an index based on an input value using index conversion characteristics corresponding to groups divided according to the magnitude of the input value and a case in which the index conversion circuitry 100 generates the index based on the input value using a single index conversion characteristic. Therefore, it is possible to perform liner interpolation corresponding to a characteristic of the input value X.

(Modification 4)

Figure 16:
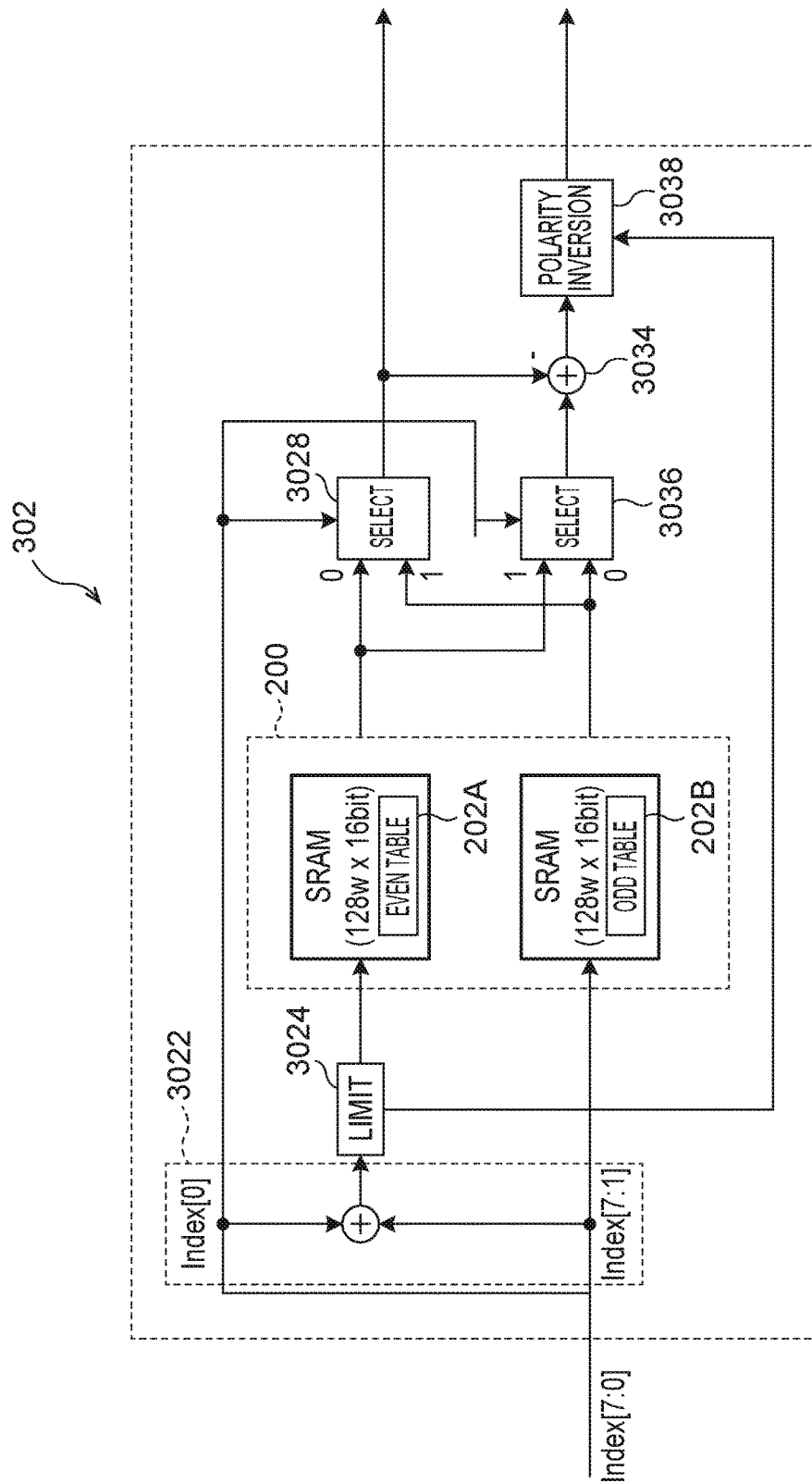
FIG. 16 is a block diagram showing the configuration of reference-value/correction-coefficient generation circuitry according to a modification 4.

FIG. 16 is a block diagram showing the configuration of the reference-value/correction-coefficient generation circuitry 302 according to a modification 4. The reference-value/correction-coefficient generation circuitry 302 according to the modification 4 is different from the reference-value/correction-coefficient generation circuitry 302 according to the second embodiment in that the reference-value/correction-coefficient generation circuitry 302 according to the modification 4 includes fourth reference-value selection circuitry 3036 and polarity inversion circuitry 3038 instead of the bit inversion circuitry 3026, the second reference-value selection circuitry 3030, and the third reference-value selection circuitry 3032 of the reference-value/correction-coefficient generation circuitry 302 according to the second embodiment. Circuitry portions different from those of the reference-value/correction-coefficient generation circuitry 302 according to the second embodiment are explained below. Explanation of the other components is omitted because the other components are the same as the components of the processing device 1 according to the second embodiment.

When Index[0] of the index is the value 0, the fourth reference-value selection circuitry outputs a converted value output by the gamma correction table for odd number index 202B. On the other hand, when Index[0] is the value 1, the fourth reference-value selection circuitry outputs a converted value of the gamma correction table for even number index 202A. That is, when Index[7:0] of the index input from the terminal 204 is not the last index number, the fourth reference-value selection circuitry 3036 outputs the converted value, which is the setting value of the entry point corresponding to the next index number of Index[7:0] of the index. When the Index[7:0] of the index input from the terminal is the last index number, the fourth reference-value selection circuitry 3036 outputs the converted value, which is the setting value of the entry point corresponding to the index number immediately preceding Index[7:0] of the index.

The difference calculation circuitry 3034 calculates a value obtained by subtracting the value output by the first reference-value selection circuitry 3028 from the value output by the fourth reference-value selection circuitry 3036 and outputs the value. That is, when Index[7:0] of the index input from the terminal is not the last index number, the difference calculation circuitry 3034 outputs a value obtained by subtracting the converted value of the entry point corresponding to the index number of Index[7:0] of the index from the converted value of the entry point corresponding to the next index number of Index[7:0] of the index. When Index[7:0] of the index input from the terminal is the last index number, the difference calculation circuitry 3034 calculates a value obtained by subtracting the converted value of the entry point corresponding to the index number of Index[7:0] of the index from the converted value of the entry point corresponding to the index number immediately preceding Index[7:0] of the index and outputs the value.

When the last index information output by the index-upper-limit detection circuitry 3024 is the value (0) indicating that the index number is not the last index number, the polarity inversion circuitry 3038 directly outputs, as a correction coefficient, the value output by the difference calculation circuitry 3034. On the other hand, when the last index information is the value (1) indicating that the index number is the last index number, the polarity inversion circuitry 3038 inverts a polarity of the value output by the difference calculation circuitry 3034 and outputs the value as a correction coefficient. That is, the correction coefficient output by the polarity inversion circuitry 3038 according to the modification 4 is a value equivalent to the correction coefficient output by the difference calculation circuitry 3034 according to the second embodiment.

As explained above, in the modification 4, the reference-value/correction-coefficient generation circuitry 302 includes the polarity inversion circuitry 3038. Consequently, when Index[7:0] of the index is the last index number, it is possible to calculate a value obtained by subtracting the converted value of the entry point corresponding to the index number of Index[7:0] of the index from the converted value of the entry point corresponding to the index number immediately preceding Index[7:0] of the index and invert the value in the polarity inversion circuitry 3038.

The term "processor" used in the above explanation means, for example, a CPU (Central Processing Unit), a GPU (Graphics Processing Unit), or circuitry such as an application specific integrated circuit (ASIC), a programmable logic device (e.g., a simple programmable logic device (SPLD)), a complex programmable logic device (CPLD), and a field programmable gate array (FPGA). The processor reads out and executes a program stored in storage circuitry to realize functions. Note that the program may be directly incorporated in circuitry of the processor instead of being stored in the storage circuitry. In this case, the processor reads out and executes the program incorporated in the circuitry to realize the functions. The processors in this embodiment are not limited to be configured as single circuitry for each of the processors. A plurality of independent kinds of circuitry may be combined and configured as one processor to realize the functions of the processors. Further, the plurality of components in FIGS. 1 and 4 may be integrated in one processor to realize the functions of the components.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:
1. A processing device comprising:
   generation circuitry configured to generate a first index based on a numerical value of a high-order number of digits in an input value represented by a bit string and a shift amount based on a numerical value of a low-order number of digits excluding the high-order number of digits;
   storage circuitry configured to store in advance, for each of indexes obtained by the generation circuitry, converted values of reference input values corresponding to the indexes as a look-up table; and
   interpolation circuitry configured to compute a second index that adjoins the first index by carrying out increment or decrement of the first index, and acquire converted values corresponding to the first index and the second index using the look-up table in the storage circuitry, and compute a converted value of the input value by linearity interpolation based on the shift amount from the reference input value of the first index,
   wherein the interpolation circuitry is configured to perform interpolation with an index larger by one than the first index as the second index in case of the first index is not a maximum value of the index stored in the look-up table, and configured to perform extrapolation with an index smaller by one than the first index as the second index in case of the first index is the maximum value of the index stored in the look-up table.
2. The processing device according to claim 1, wherein the generation circuitry generates the index based on the input value using index conversion characteristics corresponding to groups divided according to magnitude of the input value.
3. The processing device according to claim 2, wherein a number of the groups is four or eight.
4. The processing device according to claim 2, wherein the converted value allocated to the look-up table is an output value output by a predetermined function with respect to the reference input value, and
   a relationship between the input values and the indexes in a same group is liner.

5. The processing device according to any one of claims 2 to 4, wherein
the low-order number of digits used for obtaining the shift amount is changeable for each of the groups, and
the low-order number of digits is set larger as the rate of the change of the output value with respect to the input value decreases.

6. The processing device according to any one of claims 2 to 4, wherein the interpolation circuitry obtains the output value for the input value of the predetermined function through the linear interpolation on the basis of a rate of the shift amount with respect to an interval between a first reference input value corresponding to the first index and a second reference input value corresponding to the second index.

7. The processing device according to claim 1, wherein the generation circuitry calculates the first index and the shift amount on the basis of a bit string obtained by converting the input value into a binary number.

8. The processing device according to claim 6, wherein, when the generation circuitry calculates the first index and the shift amount on the basis of a bit string obtained by converting the input value into a binary number, an interval between the first reference input value and the second reference input value is a value obtained by raising 2 to power of the low-order number of digits.

9. The processing device according to claim 1, wherein the generation circuitry converts the input value into a binary number and calculates the first index and the shift amount on the basis of a bit-inverted bit string.

10. The processing device according to claim 1, wherein the generation circuitry selects and uses index conversion characteristics corresponding to groups divided according to magnitude of the input value or a single index conversion characteristic to generate the first index and the shift amount.

11. The processing device according to claim 1, wherein the generation circuitry converts the input value into a binary number and selects and uses, on the basis of a bit-inverted bit string, index conversion characteristics corresponding to groups divided according to magnitude of the input value or a single index conversion characteristic to generate the first index and the shift amount.

* * * * *